United States Patent [19]

Leone et al.

[11] Patent Number: 5,490,086
[45] Date of Patent: Feb. 6, 1996

[54] PLUG-IN GROUND FAULT MONITOR FOR A CIRCUIT BREAKER

[75] Inventors: David A. Leone, Lawrenceville; James O. Alexander, Atlanta, both of Ga.

[73] Assignee: Siemens Energy & Automation, Inc., Alpharetta, Ga.

[21] Appl. No.: 14,306

[22] Filed: Feb. 5, 1993

Related U.S. Application Data

[63] Continuation-in-part of Ser. No. 847,709, Mar. 6, 1992, abandoned.

[51] Int. Cl.$^6$ .................................................. H02J 13/00
[52] U.S. Cl. .................... 364/492; 364/480; 364/481; 364/482; 364/483; 361/93; 361/42; 361/728
[58] Field of Search ........................... 364/480–483, 364/489, 492; 324/509, 510, 512, 531, 541, 544, 555; 361/91–98, 83, 44, 105, 140, 23, 728, 42

[56] References Cited

U.S. PATENT DOCUMENTS

| | | | |
|---|---|---|---|
| 4,143,417 | 3/1979 | Wald et al. | 364/900 |
| 4,245,318 | 1/1981 | Eckart et al. | 364/481 |
| 4,351,012 | 9/1982 | Elms et al. | 361/96 |
| 4,377,836 | 3/1983 | Elms et al. | 361/96 |
| 4,377,837 | 3/1983 | Matsko et al. | 361/105 |
| 4,431,988 | 2/1984 | Molusis et al. | 340/712 |
| 4,467,434 | 8/1984 | Hurley et al. | 364/483 |
| 4,481,512 | 11/1984 | Tscheulin et al. | 340/825.25 |
| 4,507,526 | 3/1985 | Thoma | 200/38 R |
| 4,527,285 | 7/1985 | Kekas et al. | 455/607 |
| 4,535,409 | 8/1985 | Jindrick et al. | 364/481 |
| 4,589,052 | 5/1986 | Dougherty | 361/94 |
| 4,628,397 | 12/1986 | Gareis et al. | 361/98 |
| 4,631,625 | 12/1986 | Alexander et al. | 361/94 |
| 4,672,501 | 6/1987 | Bilac et al. | 361/96 |
| 4,694,373 | 9/1987 | Demeyer | 361/96 |
| 4,728,914 | 3/1988 | Morris et al. | 335/6 |
| 4,749,364 | 6/1988 | Arney et al. | 439/372 |
| 4,751,605 | 6/1988 | Mertz et al. | 361/91 |
| 4,752,853 | 6/1988 | Matsko et al. | 361/94 |
| 4,780,786 | 10/1988 | Weynachter et al. | 361/87 |
| 4,794,356 | 12/1988 | Yu et al. | 335/13 |
| 4,794,484 | 12/1988 | Matsko et al. | 361/93 |
| 4,814,712 | 3/1989 | Burton et al. | 324/424 |
| 4,827,369 | 5/1989 | Saletta et al. | 361/96 |
| 4,870,531 | 9/1989 | Danek | 361/93 |
| 4,897,756 | 1/1990 | Zylstra | 361/97 |
| 4,945,443 | 7/1990 | DeBiasi et al. | 361/93 |
| 4,958,252 | 9/1990 | Murphy | 361/93 |
| 4,979,070 | 12/1990 | Bodkin | 361/42 |
| 4,991,105 | 2/1991 | Pimental | 324/510 |
| 5,051,861 | 9/1991 | Purhayastha et al. | 361/96 |
| 5,136,457 | 8/1992 | Durivage, III | 361/42 |
| 5,166,887 | 11/1992 | Farrington et al. | 361/94 |
| 5,204,798 | 4/1993 | Scott | 361/93 |
| 5,311,392 | 5/1994 | Hinney et al. | 361/93 |

FOREIGN PATENT DOCUMENTS

| | | |
|---|---|---|
| 0193449 | 2/1986 | European Pat. Off. . |
| 0279691 | 8/1988 | European Pat. Off. . |
| 2513436 | 9/1982 | France . |
| 0493272 | 12/1991 | France . |
| 0193732 | 1/1986 | Germany . |
| 4072927 | 4/1985 | Japan . |

*Primary Examiner*—Emanuel T. Voeltz
*Assistant Examiner*—Hal D. Wachsman
*Attorney, Agent, or Firm*—Richard M. Ludwin; Donald M. Boles; Peter A. Luccarelli, Jr.

[57] ABSTRACT

The present invention provides a plug-in ground fault monitor module for a circuit breaker trip unit configured to operate with a plurality of different plug-in plug-in modules. The ground fault monitor module includes a memory which stores data representative of the its particular function. This memory is readable by the trip unit and enables the trip unit to automatically adapt to communicate monitored ground fault data to the ground fault module. The ground fault module also includes means for setting threshold levels for a ground fault alarm signal. The ground fault alarm signal is generated independently of ground fault alarms in the trip unit based on its internal thresholds. This signal can be used to control an external relay which operates a shunt trip mechanism or an external alarm. The trip unit includes a processor and programming which permits a bi-directional flow of data between the units, such as display data and control data.

16 Claims, 11 Drawing Sheets

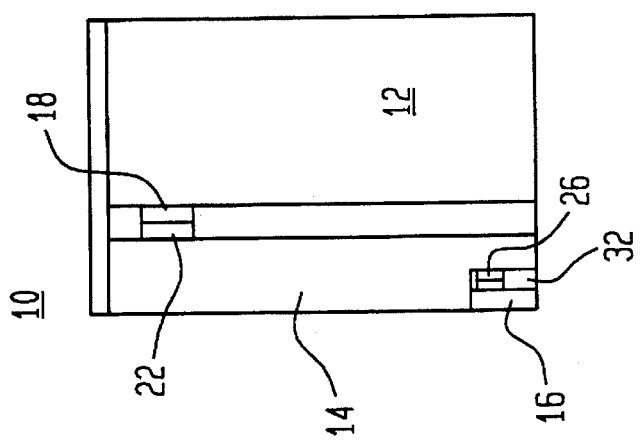
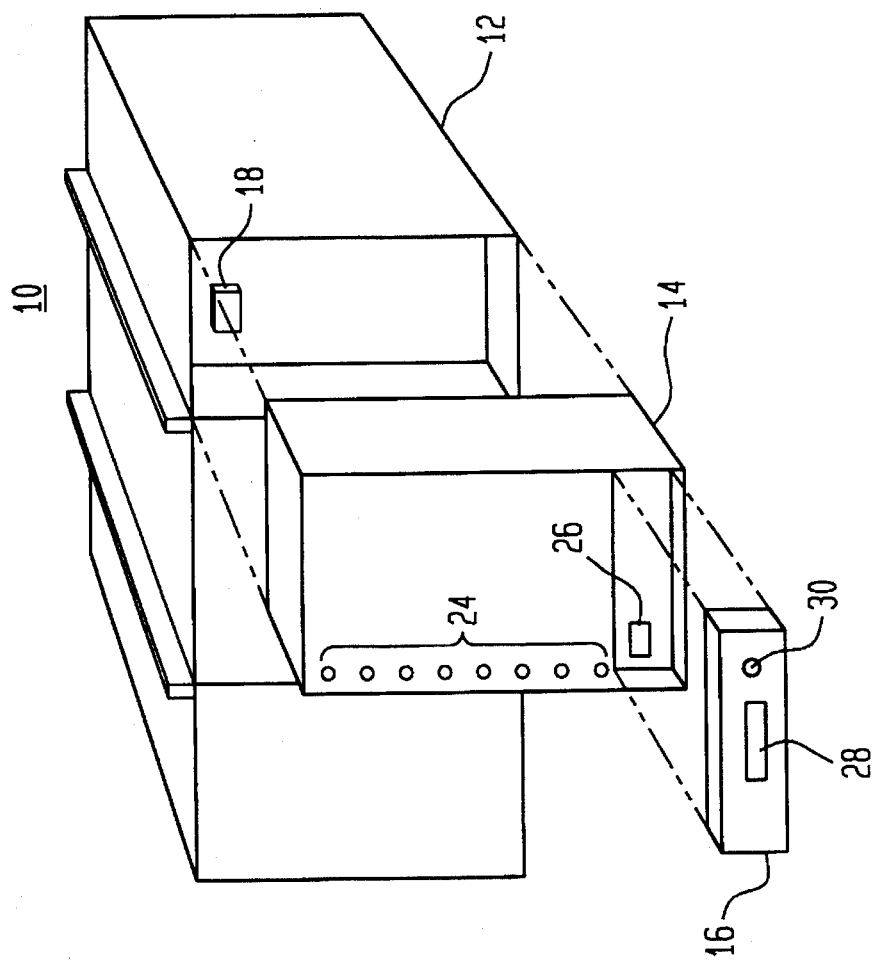

PLUG-IN GROUND FAULT MONITOR FOR A CIRCUIT BREAKER

CROSS REFERENCE TO RELATED APPLICATIONS

This is a continuation-in-part of U.S. patent application Ser. No. 07/847,709 filed on Mar. 6, 1992, now abandoned.

BACKGROUND OF THE INVENTION

1. Field of the Invention

The present invention relates to a ground fault monitor module for a circuit breaker trip unit. More specifically, the present invention relates to a ground fault display and monitor module for trip unit which is coupleable to one of a plurality of different modules, where the trip unit is configured to automatically recognize the type of module to which it is coupled and apply signals to the module which are compatible with the module.

2. Related Art

In general, display units for circuit breaker trip units are known. Referring to U.S. Pat. No. 4,870,531 issued to Robert J. Danek, there is shown a circuit interrupter having a display for viewing circuit interrupter settings. The display removably connects to the electronic trip unit of the interrupter, and displays interrupter values and settings when in operation. When the display unit is not in place, a security cover 20 may be positioned within a recess which is adapted to accept the display.

U.S. Pat. No. 4,751,605, issued to Mertz et al., also discloses a trip device for a circuit interrupter having a display unit. The display unit is portable and is coupleable to the trip device to display various circuit interrupter values. The display unit includes an alphanumeric display, a microprocessor, memory, and an apparatus associable with complementary apparatus in the trip device to transfer the contents of memory areas in the trip device to the memory of the display device. The content of the memory is selectively displayed by the reader.

While various display unit configurations are available for circuit interrupters (breakers), it would be useful and desirable to provide a trip unit useable with a plurality of different display units, where each display unit is configured to display a range of values for a given variable monitored by the trip unit e.g. current, temperature, energy, power, etc. Accordingly, depending upon the application for a circuit breaker, only a display unit configured to display the variables which are needed for the application is provided.

SUMMARY OF THE INVENTION

The present invention provides a circuit breaker trip unit. The trip unit includes a first connector, a processor, a data bus coupled between the connector and the processor, and a display module. The display module includes a memory which stores configuration data, and a second connector coupled to the memory and the first connector. The processor reads the configuration data and controls the data transfer between the processor and module based upon the configuration data.

The present invention further provides a system for adapting the operation of a trip unit to a particular display module. The trip unit includes a processor, and a first connector coupled to the processor. The system provides at least two display module types, where a first display module includes a first memory which stores a first configuration data coupled to a second connector. A second display module includes a second memory which stores a second configuration data coupled to a third connector. When the first and second connectors are connected, the processor reads the first memory, and applies first display data to the first display module in response to the value of the first configuration data. When the first and third connectors are connected, the processor reads the second memory and applies second display data to the second display module in response to the value of the second configuration data.

BRIEF DESCRIPTION OF THE DRAWINGS

FIG. 1 is an exploded, schematic view of a circuit breaker contact and operating mechanism unit, a trip unit and a display unit;

FIG. 2 is a side, schematic view of the circuit breaker contact and operating mechanism, trip unit and display unit when coupled;

DETAILED DESCRIPTION OF THE PREFERRED EMBODIMENT

Figure 3:
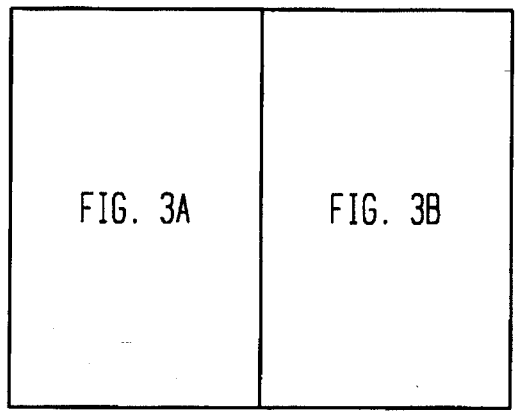
FIGS. 3A and 3B are the circuit diagrams for the display unit.
Figure 4:
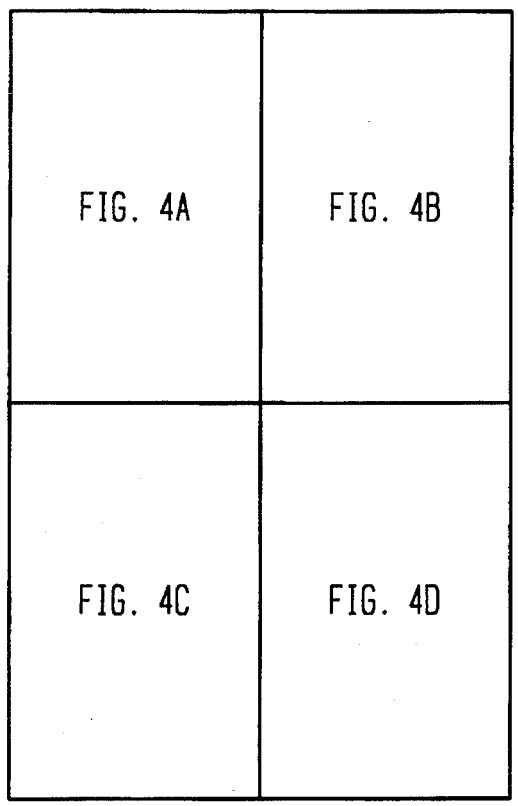
FIGS. 4A, 4B, 4C and 4D are the circuit diagrams for the circuitry of the trip unit which interfaces with the display unit.

Referring to FIGS. 1 and 2, a circuit breaker 10 includes a circuit breaker contact and operating mechanism 12, an electronic trip unit 14, and a removable and interchangeable display unit 16.. Mechanism 12 may be a conventional mechanism including the operating linkages and energy storing devices for opening the contacts of circuit breaker 10. Additionally, mechanism 12 includes monitoring devices, such as current transformers and temperature sensors, which produce status signals representative of the current flows and various temperatures in circuit breaker 10. The monitoring devices are electrically coupled to a connector 18 of the trip unit 14 such that the status signals for the monitoring devices are applied to connector 18. Additionally, mechanism 12 includes tripping devices which are coupled to connector 18 and cause mechanism 12 to open the circuit breaker contacts in response to the application of control signals at connector 18.

Electronic trip unit 14 is of the type including a programmed micro-controller 20 (processor) which has circuitry coupled to a connector 22 for monitoring the status signals applied to connector 18. The circuitry includes devices for performing conditioning functions such as analog-to-digital conversion and filtering so that processor 20 may properly monitor and analyze the status signals at connector 18. Unit 14 also includes a plurality of limit set inputs such as rotary switches or potentiometers 24. Rotary switches 24 allow variables such as long time delay, short time pick-up, short time delay, instantaneous pickup, ground fault pickup and ground fault delay to be adjusted. Based upon the values of the status signals and the settings at rotary switches 24, processor 20 applies the appropriate control signals and display signals to connectors 18 and 26, respectively. Connector 26 is connected to processor 20 by a data bus 34 and appropriate interface circuitry.

Connector 22 is mechanically and electrically connected to connector 18 when circuit breaker 10 is assembled. Of course, unit 14 could be appropriately wired to mechanism 12 without the use of connectors 18 and 26.

Display unit (module) 16 may have a plurality of configurations, and, generally, includes a multi-digit display 28, a multi-position switch 30, a connector 32, and a memory 36 for storing configuration data (address). Memory 36 may take the form of dip switches, a set of jumpers (presently preferred embodiment), PROM or other types of ROM. Display 28, switch 30 and memory 36 are coupled to connector 32 such that data may be transferred between unit 14 and unit 16 along data bus 34 when units 14 and 16 are mechanically connected, and connectors 26 and 32 are mechanically and electrically connected.

When unit 14 is operating, and coupled to unit 16, unit 14 reads the data in memory 36 (e.g. 4 bits, one associated with each of 4 jumpers 46, 48, 50 and 52) to determine the configuration of unit 16. All of the 4 bits of data are available for configuration data, thus unit 14 can automatically recognize up to 15 configurations of display unit 16. A 16th jumper/data configuration (all 4 data bits high) is recognized by the trip unit 14 as indicating that a display unit 16 is not present. Upon recognizing the unit 16 configuration, processor 20 operates under the control of the portion of the program stored in unit 14 associated with the particular configuration. For example, one unit 16 may be programmed to display amperage, where each switch 30 setting is associated with different amperage readings while other units may be configured to display a circuit breaker variable such as temperature, power or energy use. Furthermore, display unit 16 may be configured such that trip unit 14 reads switch 30 to acquire control or limit values such as alarm limits. By way of example, switch 30 may include 10 settings thus allowing the display of 10 different characteristics (values) of a given variable, control value or limit value.

Referring more specifically to the characteristics (values) associated with the ten switch positions of switch 30, when switch 30 is associated with a display unit 16 configured to display amperage, switch 30 settings may include:

Present demand, which provides data for processor 20 so that the average amperage load for the last 15 minute period is displayed;

Maximum demand, which provides data for processor 20 so that the maximum amperage load since power was applied to the circuit breaker is displayed;

Phase A current, which provides data for processor 20 so that the amperage load for phase A is displayed;

Phase B current, which provides data for processor 20 so that the amperage load for phase B is displayed;

Phase C current, which provides data for processor 20 so that the amperage load for phase C is displayed;

60% load monitor set point, which provides data for processor 20 so that the maximum phase current is displayed and flashed when the current exceeds 60% of the rated value;

70% load monitor set point, which provides data for processor 20 so that the maximum phase current is displayed and flashed when the current exceeds 70% of the rated value;

80% load monitor set point, which provides data for processor 20 so that the maximum phase current is displayed and flashed when the current exceeds 80% of the rated value;

90% load monitor set point, which provides data for processor 20 so that the maximum phase current is displayed and flashed when the current exceeds 90% of the rated value; and 100% load monitor set point, which provides data for processor 20 so that the maximum phase current is displayed and flashed when the current exceeds 100% of the rated value.

Subsequent to determining the configuration of a particular display unit 16, processor 20 reads the status of switch 30, and transmits display data to unit 16 over data bus 34, where the display data is representative of the characteristic selected at switch 30 and the particular configuration of unit 16 (i.e. the data in memory 36). Thus, if processor 20 reads memory 36 and determines that unit 16 is an amperage display unit, reads switch 30 and determines that the RMS current for phase A is to be displayed, processor 20 will access the appropriate programming and apply the appropriate display data to display 28 via data bus 34 to display the RMS current value for phase A in digital form (alphanumeric) on display 28.

Figure 3A:
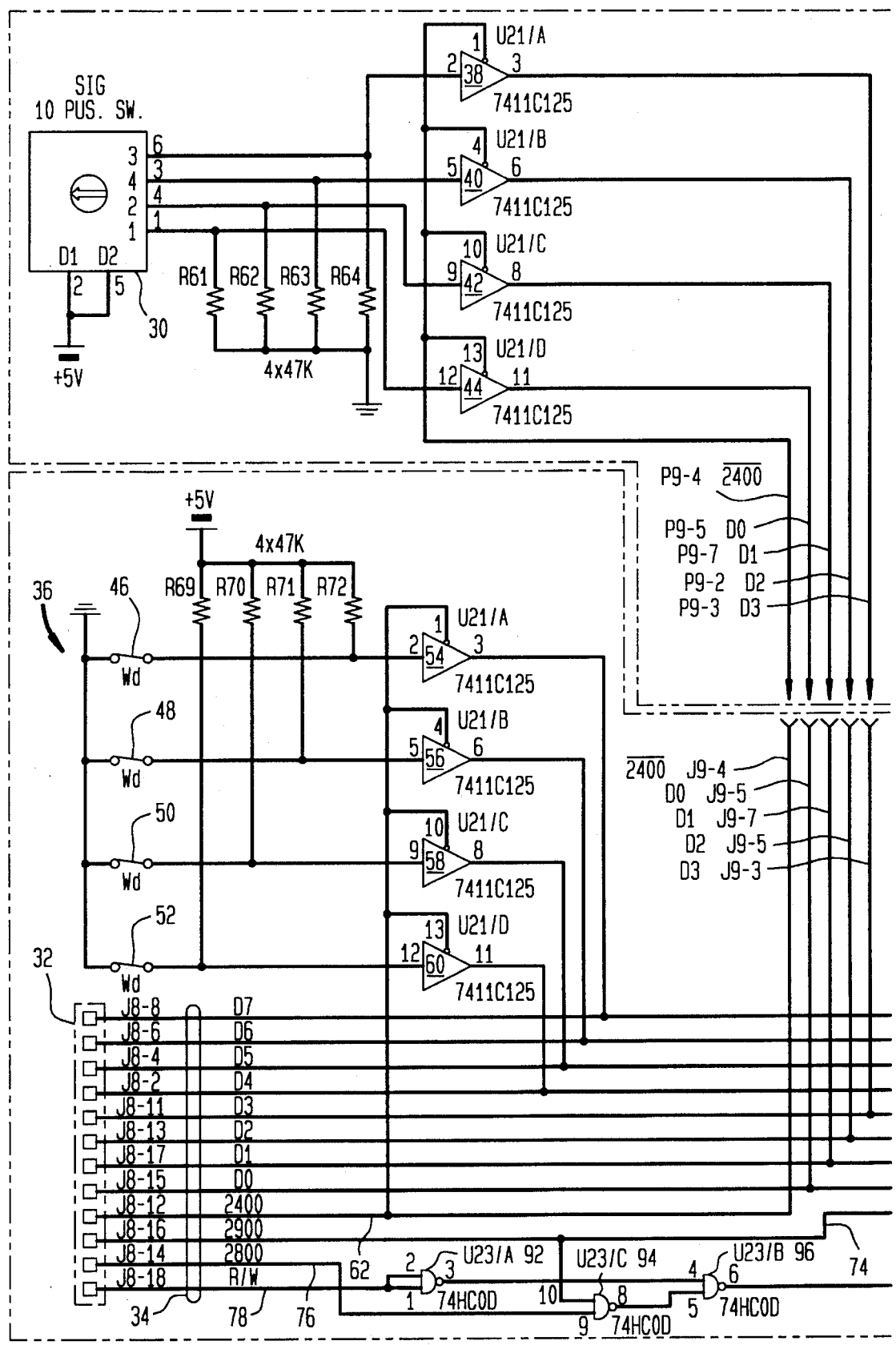
Figure 3B:
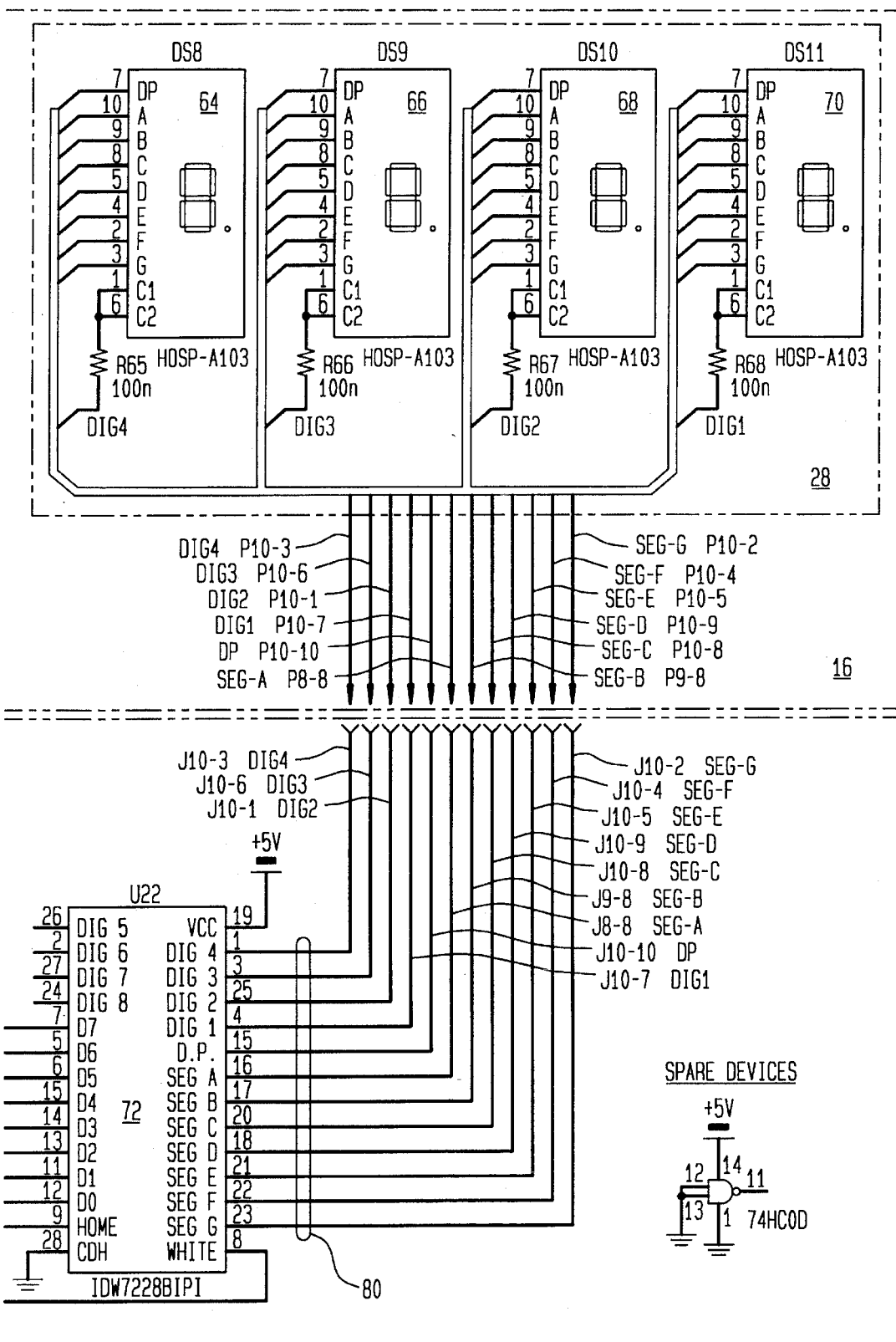
Figure 4A:
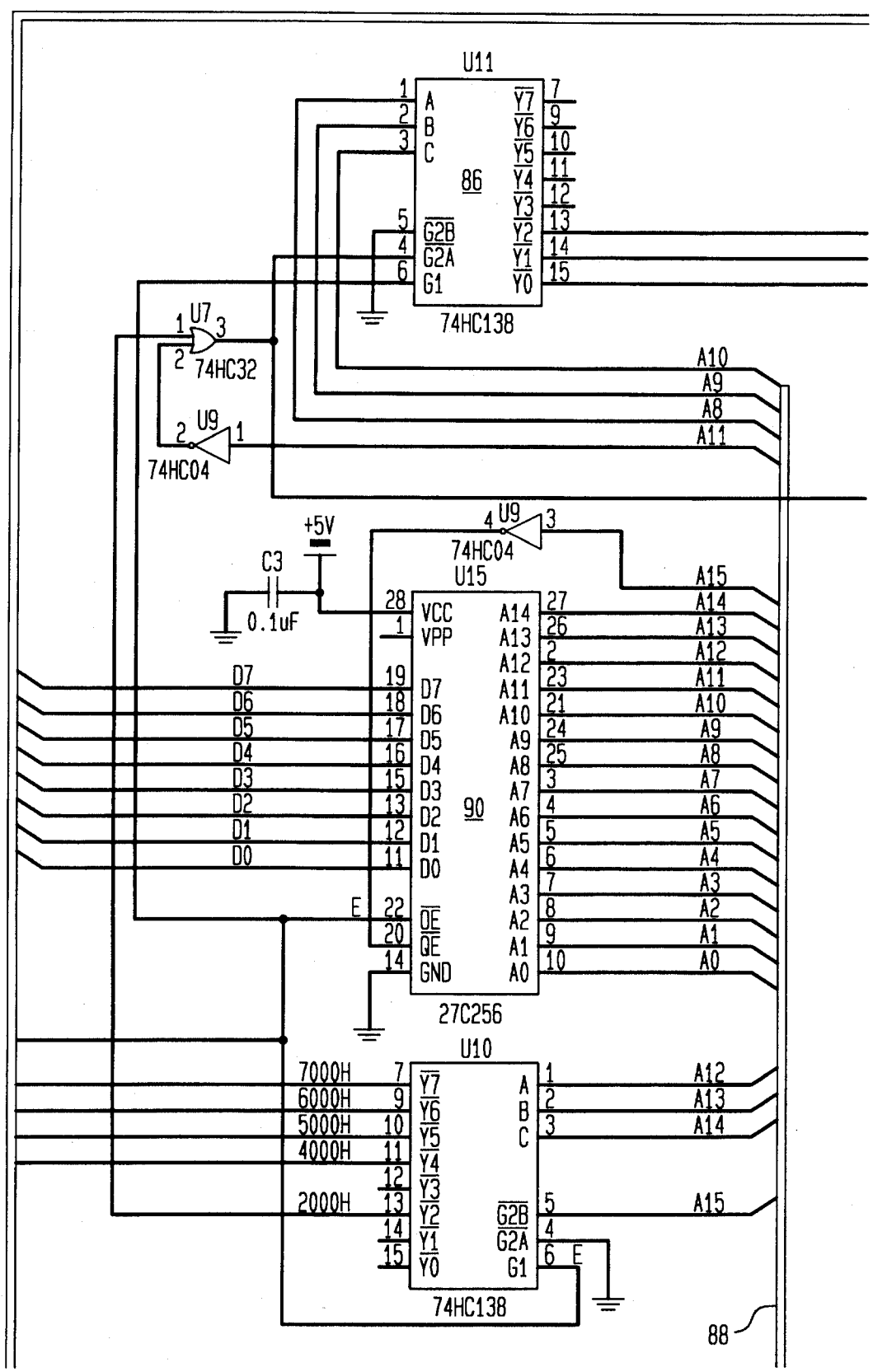
Figure 4B:
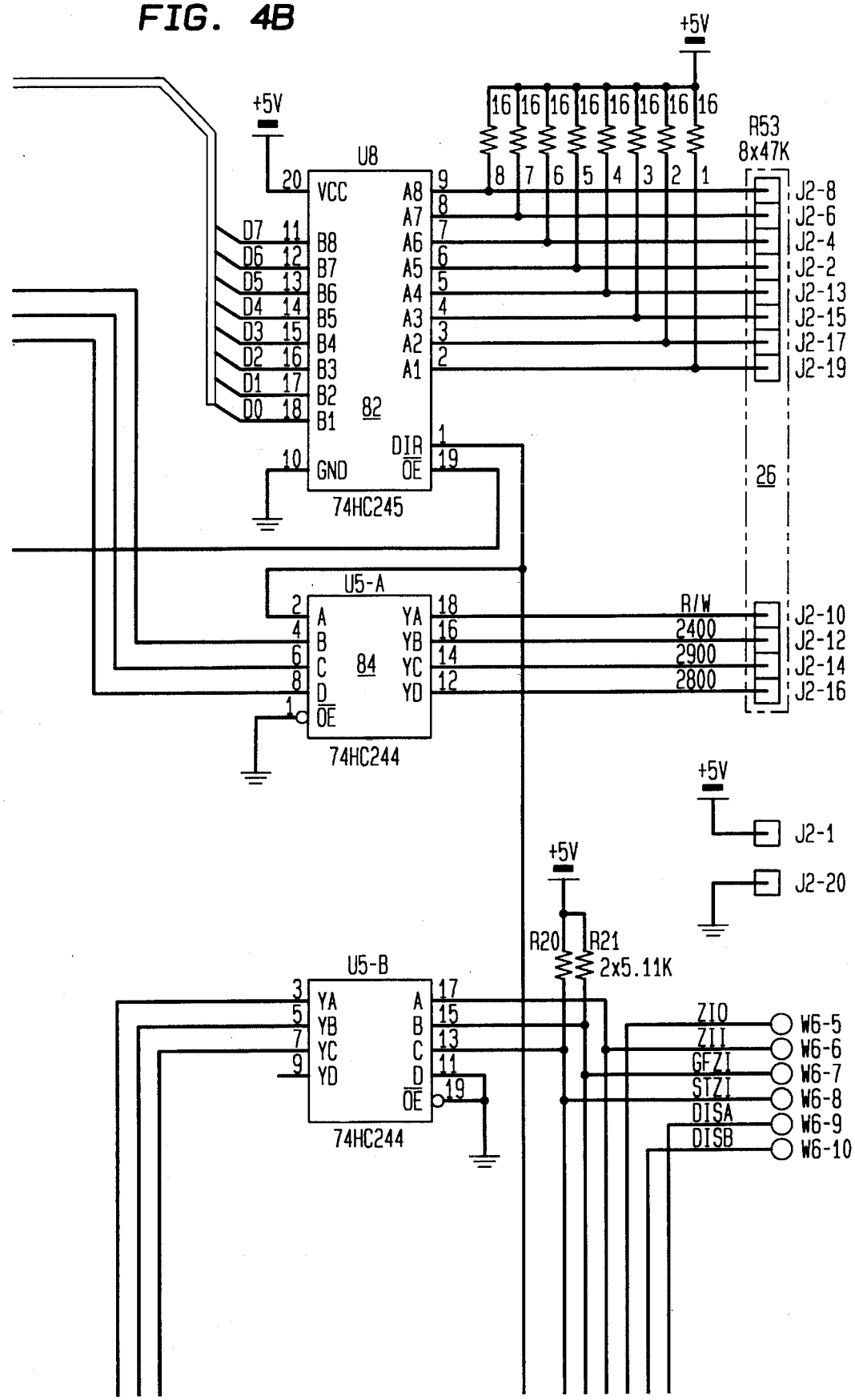
Figure 4C:
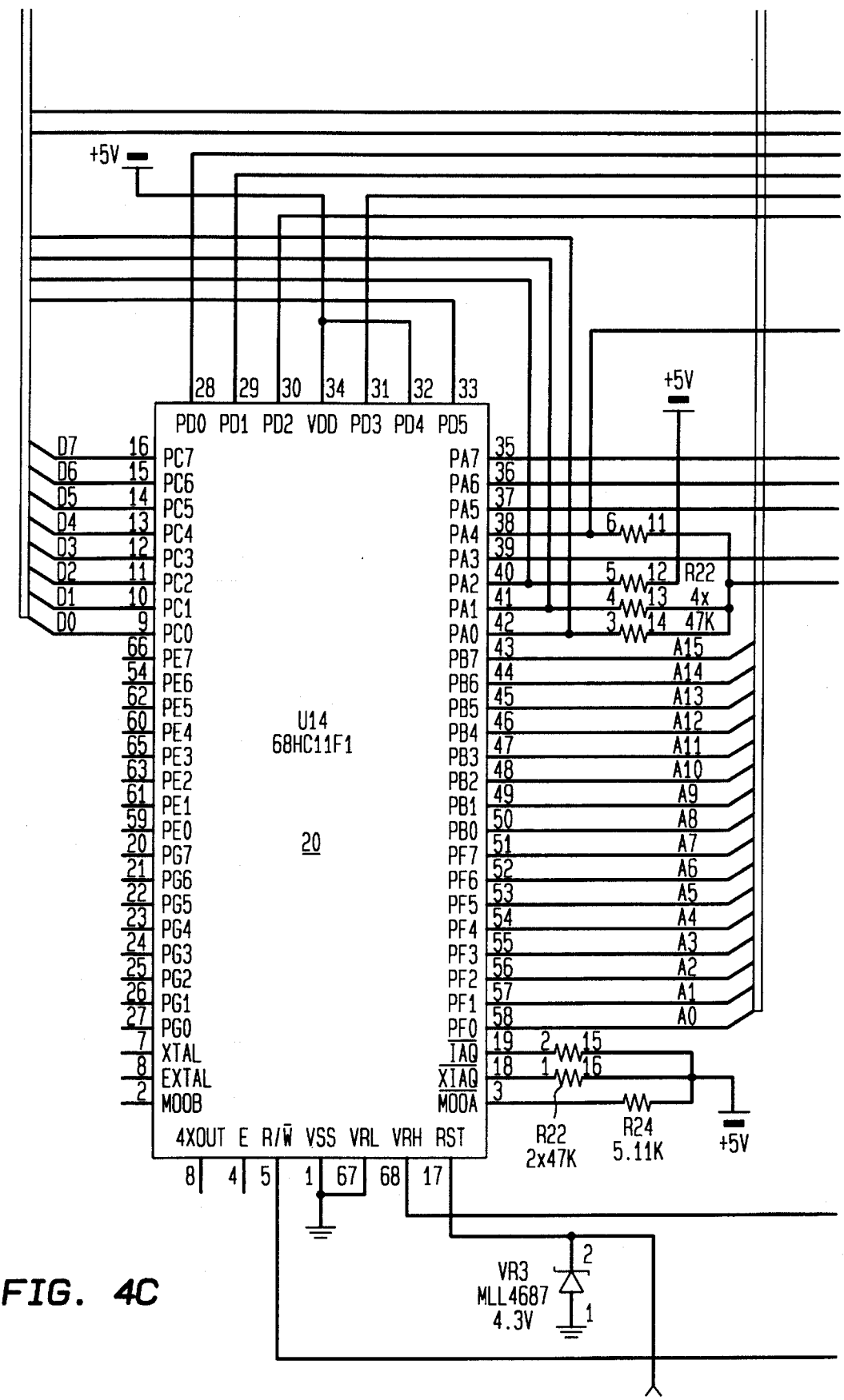
Figure 4D:
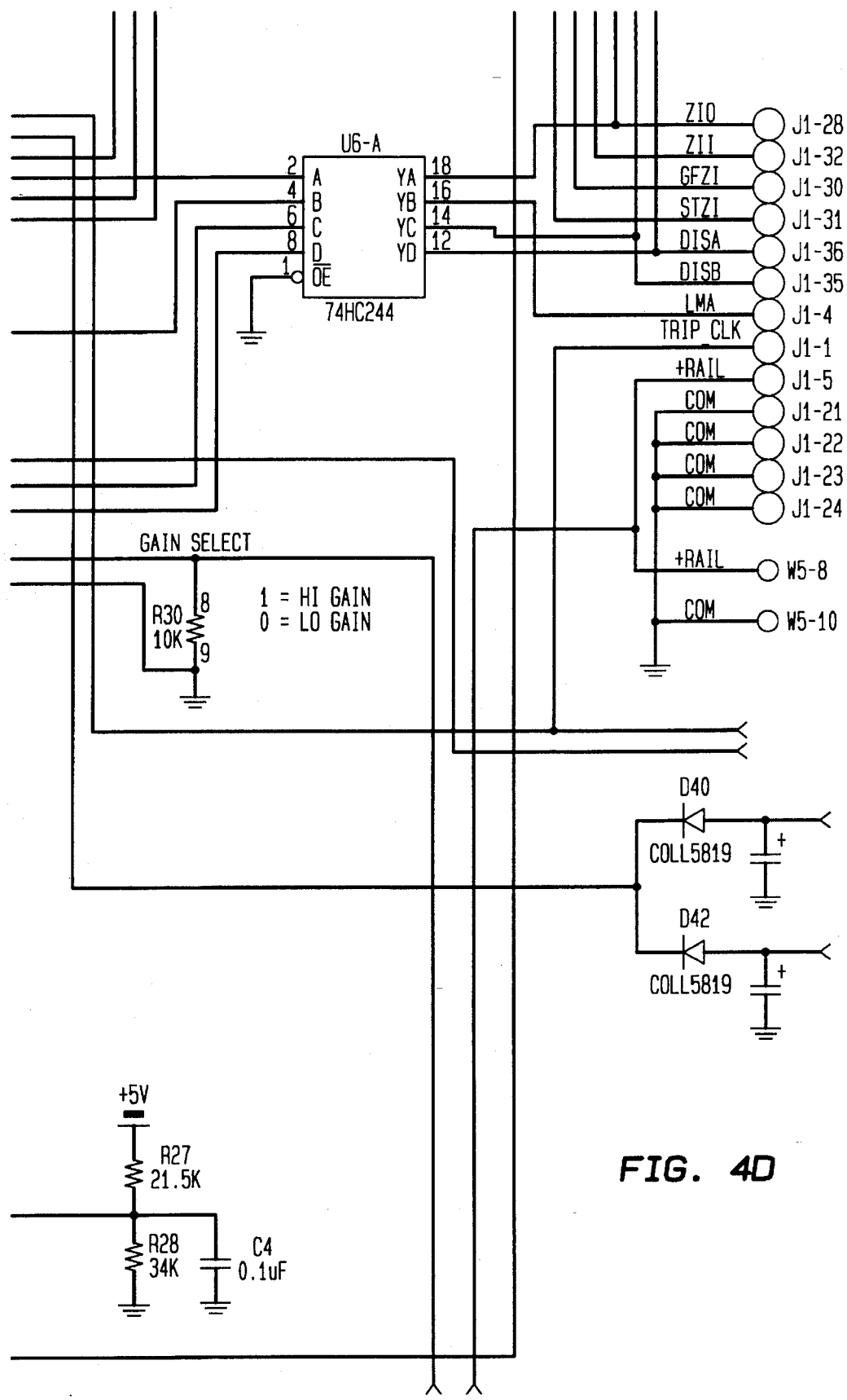

Referring to FIGS. 3A and 3B, these Figures illustrate the circuitry for display unit 16. Unit 16 includes switch 30 coupled to the four low order bits (lines) of data bus 34 by buffers 38, 40, 42 and 44. As discussed above, the presently preferred embodiment of memory 36 may include a set for four jumpers 46, 48, 50 and 52. Jumpers 46, 48, 50 and 52 are coupled to the four high order bits (lines) of data bus 34 by buffers 54, 56, 58 and 60, respectively. When address select line 62 of bus 34 (address 2A00 hex) goes low, switch 30 and memory 36 settings are read by processor 20 over data bus 34.

Display unit 16 also includes four seven segment LED's 64, 66, 68 and 70, and a display driver 72. (By way of modification, displays 64, 66, 68 and 70, and display driver 72 may be replaced by a single chip unit depending upon the application.) Data bus 80 couples display driver 72 to displays 64, 66, 68 and 70. Display driver 72 is coupled to data bus 34 and is controlled by address select lines 74 (address 2800 hex) and 76 (address 2900 hex). A data line 78 is the processor 20 read/write line. When processor 20 writes to address 2800, lines 74 and 78 go low. Address 2800 is used to send data to display driver 72. When processor 20 writes to address 2900, lines 76 and 78 go low. This address is used to send control commands to display driver 72.

When display unit 16 is plugged into trip unit 14, data line J8-19, J8-17, J8-15, J8-13, J8-2, J8-4, J8-6, and J8-8 (D0–D7) connect unit 16 to trip unit 14 via data lines J2-19, J2-17, J2-15, J2-13, J2-2, J2-4, J2-6, and J2-8 (D0–D7), respectively. Also, address select lines 74, 76, 62, and 78 are connected to trip unit 14 via address select lines J2-16, J2-14, J2-12 and the read/write line J2-10, respectively.

Referring to FIGS. 4A, 4B, 4C and 4D, it can be seen the trip unit's processor/interface logic 15 includes a processor 20 (Motorola 68HC11F1) coupled to data bus 34, and buffer 82 also coupled to data bus 34. Buffer 82 acts as an isolation buffer between display unit 16 and trip unit 14 for data lines E0–D7. The processor/interface logic 15 of unit 14 also includes an isolation buffer 84 coupled to a decoder 86 which in turn is coupled to an address bus 88 coupled to processor 20. Buffer 84 acts as an isolation buffer between display unit 16 and trip unit 14 address select and read/write lines.

In addition to processor 20, buffer 82, buffer 84 and decoder 86, the processor/interface logic 15 of trip unit 14 includes an EPROM 90 coupled to data bus 34 and address bus 88. The programming for processor 20, which controls the transfer of data between display unit 16 and trip unit 14, is stored in the memory of processor 20 and EPROM 90 (the source code for this programming is included in Appendix A).

In operation, when processor 20 reads address 2A00 (address line 62), data bits 4 through 7 (data lines J8-2, J8-4, J8-6 and J8-8) are tested for a high state. If they do not all test high, then processor 20 assumes that trip unit 14 and display unit 16 are connected via connectors 26 and 32. In response, a portion of the display module control code (Appendix A) is activated. Subsequently, the type of display unit 16 is determined by decoding data lines J8-8, J8-6, J8-4 and J8-2. After the type of display unit 16 is determined, the position of switch 30 is determined by decoding data lines J8-13, J8-15, J8-17, and J8-19. Based upon this data, processor 20 then selects the function from the display module software (code) which is to be activated such that data is applied to display 28 to provide proper alphanumeric information at the display.

When the values displayed at display 28 are to be flashed due to a maximum phase current exceeding a set point, as discussed above, processor 20 alternately sends a display data command and a display blanking command to the display driver 72, thus causing the display 28 to flash.

An example of a particularly useful type of display unit 16 is a ground fault monitor module. Advantageously, the internal circuitry of the ground fault module is identical to that of the general display unit of FIG. 3.

Figure 5:
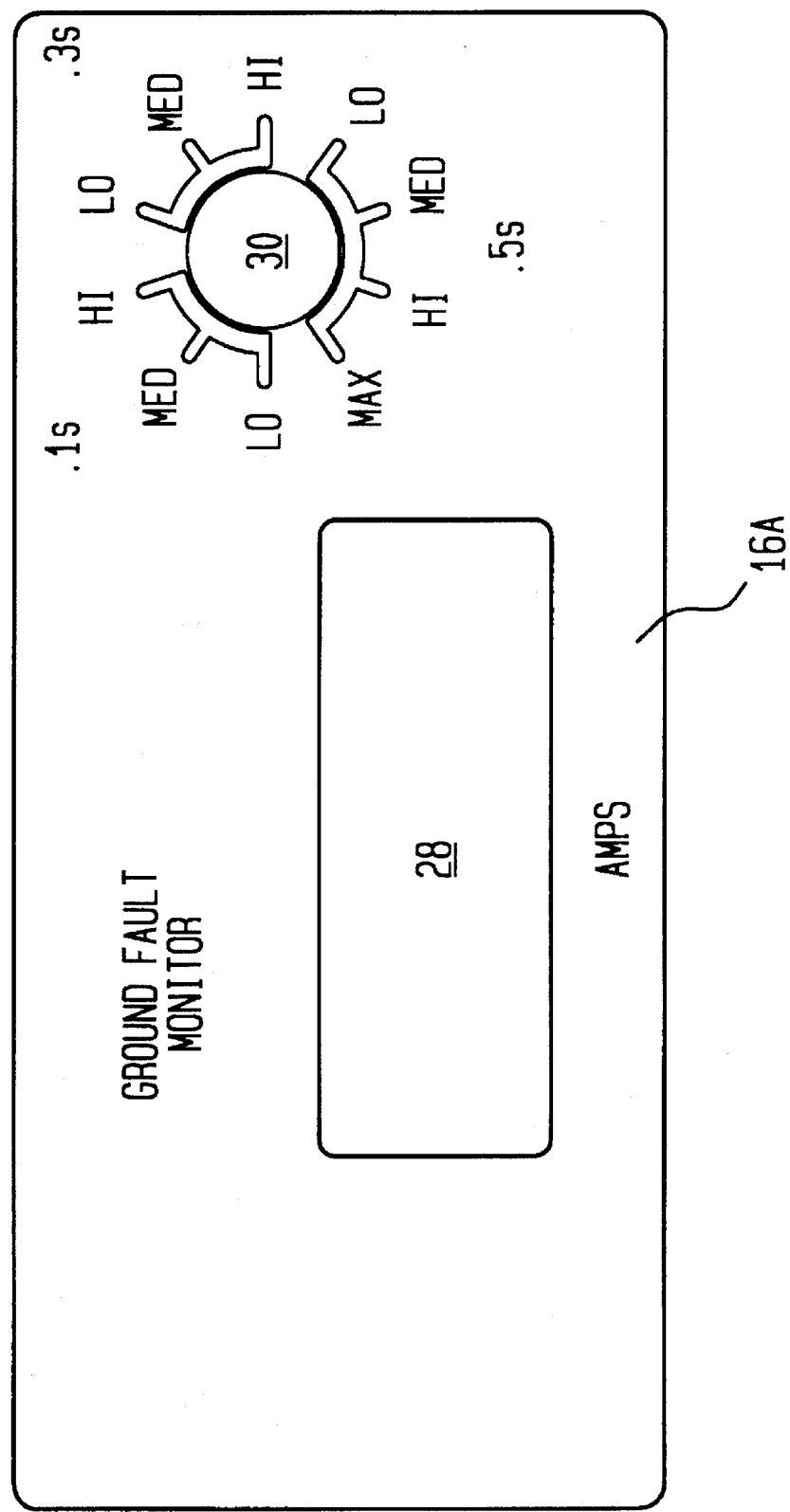
FIG. 5 is a block diagram of a ground fault display unit according to an embodiment of the present invention.

The display unit 16 is configured as a ground fault monitor module by setting the jumpers 46–52 to a predetermined configuration (one that is recognized by the trip unit is being indicative of a ground fault monitor module) and by providing the module 16 with an appropriate face plate for indicating the functions associated with each of the positions of the rotary switch 30. The externals of such a ground fault monitor module 16A are shown FIGS. 5.

When the ground fault monitor module 16A is plugged into the trip unit 14, the program code in the trip unit's EPROM 90 recognizes the jumper configuration as indicating that the display module 16 is a ground fault monitor module 16A.

Figure 6:
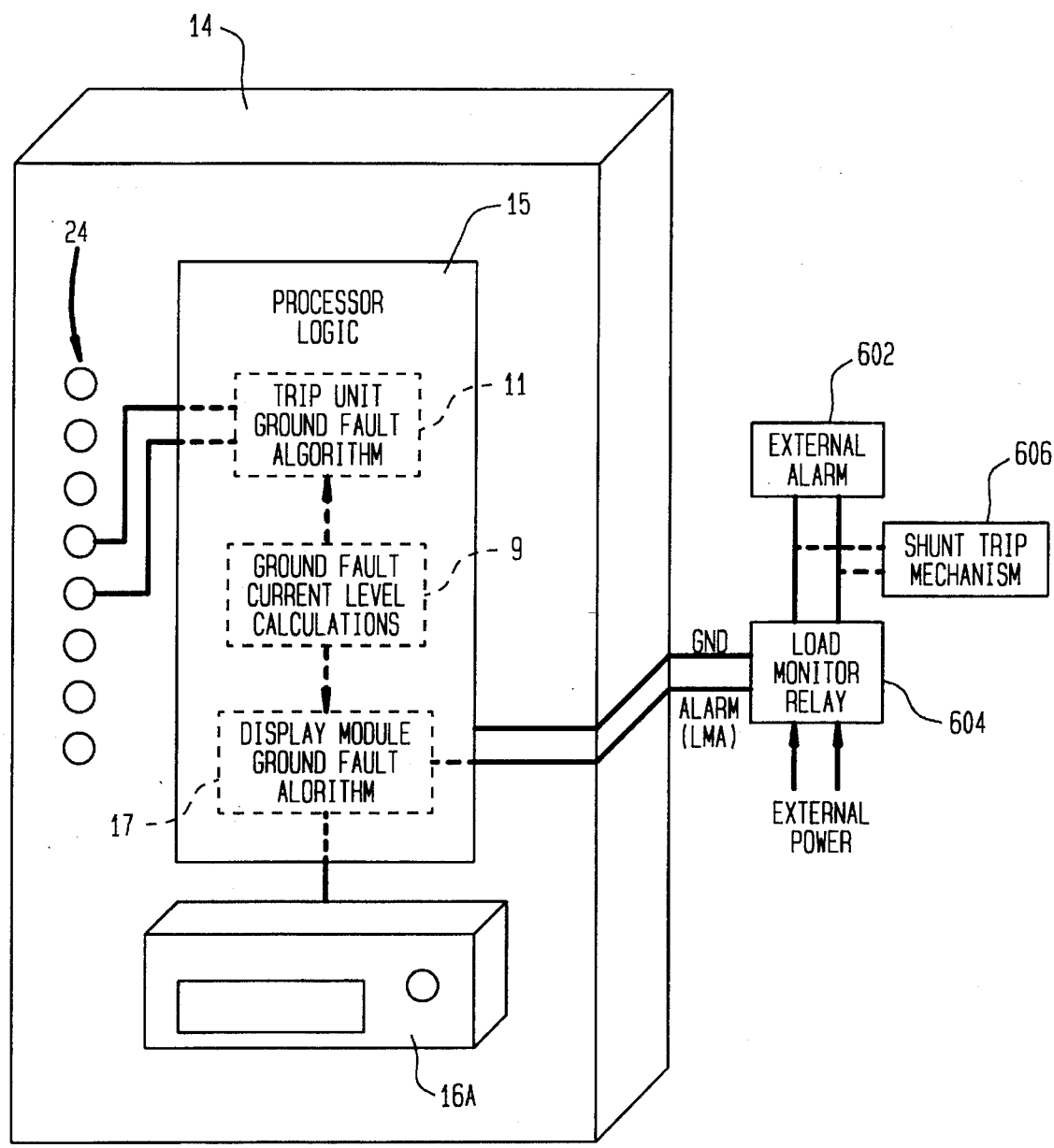
FIG. 6 is a block diagram of a trip unit having a ground fault display unit connected to an external load monitor relay according to an embodiment of the present invention; and, FIG. 7 is a functional block diagram of the ground fault algorithms/mechanisms of FIG. 6.

As illustrated in FIG. 6, the processor/interface logic 15 includes program code (executed by the processor 20) for performing ground fault level calculations 9. An embodiment of this code is included in Appendix A. The processing/interface logic also includes code for a ground fault protection algorithm 17 (for the display module 16A) and can include program code for performing a separate and independent trip unit ground fault protection algorithm 11. Rotary switches 24 set the ground fault pickup and delay. When the trip unit ground fault protection algorithm 11 detects that the ground fault current has exceeded the pickup setting for the selected time delay, it takes appropriate action (e.g. causes a trip) in response thereto. Ground fault current monitoring circuitry and an associated ground fault protection mechanism suitable for use in conjunction with the present invention are described, for example, in United States patent application Ser. No. 08/183/106, now U.S. Pat. No. 5,386,183 which was a file wrapper continuation of Ser. No. 07,714,282 filed on Jun. 12, 1991 which is incorporated by reference herein in its entirety.

The trip unit 14 includes an internal switch (not shown) the setting of which determines the ground fault calculation method. This switch is readable by the microprocessor 20. If the ground fault monitor module 16A is installed in a trip unit with a ground fault protection, the ground fault type switch setting on the trip unit determines the calculation method (residual or source ground). In a non-ground fault trip unit, the ground fault type switch is set to the residual setting. If the module 16A is installed in a trip unit that does not include ground fault protection, the display module ground fault algorithm uses the residual current calculation method. The pickup and delay settings of the ground fault monitor module 16A work independently of the trip unit's internal ground fault pickup and delay settings set by the rotary switches 24.

The ground fault pickup within the trip unit is divided into three levels; "Lo", which is defined as 20 percent of the frame rating; "Hi", which is defined as the frame rating or 1200 amps, whichever is less; and "Med", which is defined as the average of the "Lo" and "Hi". The ground fault trip delay is divided into three fixed times. These times are 0.1, 0.3 and 0.5 seconds. An additional monitoring option has a 1200 amp pickup and a 0.5 second delay.

Turning again to FIG. 5, the rotary switch 30 of the ground fault monitor module 16A has ten positions. The switch 30 is read by the program code in the EPROM 90 to determine the user selected pickup and delay options. The user selects a Lo, Med or Hi pickup level, by way of the rotary switch 30, when selecting a time delay. The tenth position (MAX) indicates that the user has selected the 1200 amp pickup and a 0.5 second delay.

When the ground fault exceeds the selected pickup and delay, the alarm line ("LMA") is set to its "ON" state and remains in that state as long as the current is above the selected pickup. The alarm line is also set to its "ON" state if no module is installed or a module 16 is removed after the trip unit is powered up. Preferably, there is a delay before the alarm line is set to its "ON" state.

The ground fault monitor 16A displays the ground fault current in amps when there is enough power to drive the display LEDs (3 phase—8% frame rating, 2 phase—12% frame rating, 1 phase 24% frame rating). When the ground fault current reaches a level 12 percent below the selected pickup, the amps displayed start to flash. This acts as an early warning alarm. When the ground fault current exceeds the selected ground fault pickup, the display will flash "OL".

As illustrated in FIG. 6, the ground fault monitor 16A can be used in conjunction with a local load monitor relay 604 to provide hard wired contacts for external ground fault protection 606 such as a shunt trip mechanism and/or an external alarm 602. The load monitor relay is driven by the alarm signal (LMA).

Figure 7:
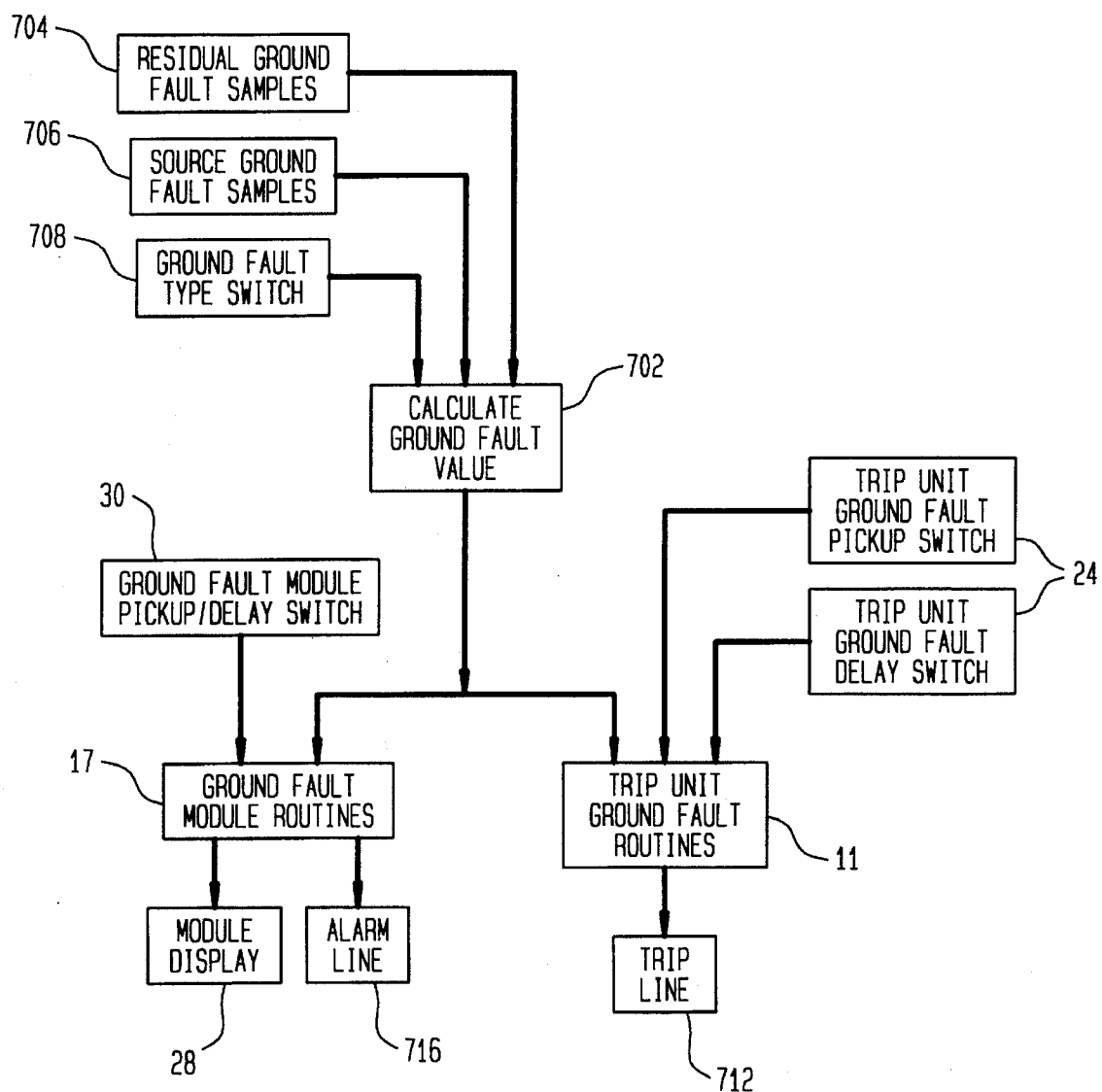

FIG. 7 is a functional block diagram of the ground fault algorithms/mechanisms of FIG. 6. In block 702, the ground fault current level calculation algorithm 9 calculates the ground fault values based on either residual ground fault samples 704 or source ground fault samples 706 as directed by the setting of the ground fault type switch 708. The ground fault values calculated in block 702 are provided to the ground fault module algorithm (routines) 17 and the trip unit ground fault algorithm 11. The trip unit ground fault algorithm 11 compares the ground fault values with the settings of the trip unit ground fault pickup and delay rotary switches 24 and generates control signal on the trip line 712 when the ground fault values exceed the selected pickup setting for the selected delay time. In parallel with the activity of the trip unit ground fault algorithm 11, the ground fault display module algorithm 17 generates display data indicative of the ground fault values (and sends it to the module display 28) and compares the ground fault values to the pickup and delay settings of the rotary switch 30 of the ground fault display unit 16A. When the ground fault values exceed the thresholds set by the rotary switch 30 on the module 16A, the ground fault display module routines 17 generate a signal on the trip alarm line 714.

It will be understood that the above description is of the preferred exemplary embodiment of the invention, and that the invention is not limited to the specific form shown. For example, various components of the above-described trip unit and display unit may be modified to combine various discreet components into single multi-function components. Furthermore, it is contemplated that portions of the software may be replaced with appropriately configured hardware, and, controller used as processors 20, the software may be modified such that hardware in the circuits may be eliminated. Various other substitutions, modifications, changes and omissions may be made without departing from the spirit of the invention, as expressed in the appended claims.

APPENDIX A

```
/*************************************************************************

SYSTEM BREAKER ELECTRONIC TRIP UNIT PROGRAM
                       Main Module
                    68HC11-F1 Processor
                       Project 433
                       Version 3.00

COPYRIGHT 1992 Siemens Energy & Automation, Inc.

**************************************************************************/

/*************************************************************************
    The source code listed below is the code that controls the display
    modules.
**************************************************************************/ main ()
{
  while (1)
  {
    .
    .
    .
    if (MONITOR_SW != 0xFF)   /* is a plug-in module installed? */
    {
      Display_Type = (MONITOR_SW & 0x70) >> 4;
      switch (Display_Type)
      {
        case 0 :
          LM_Installed = TRUE;
          Display_0 ();   /* Type 0 Display Module */
          break;
        case 1 :
          GFM_Installed = TRUE;
          Display_1 ();   /* Type 1 Display Module */
          break;
        case 2 :
          Display_2 ();   /* Type 2 Display Module */
          break;
        case 3 :
          Display_3 ();   /* Type 3 Display Module */
          break;
        case 4 :
          Display_4 ();   /* Type 4 Display Module */
          break;
        case 5 :
          Display_5 ();   /* Type 5 Display Module */
          break;
```

```
        case 6 :
          Display_6 ();   /* Type 6 Display Module   */
          break;
        case 7 :
          Display_7 ();   /* Type 7 Display Module   */
          break;
      }
    }
    else
    {
      LM_Installed = FALSE;
      GFM_Installed = FALSE;
    }
    .
    .
    .
    .
    if (MONITOR_SW = = 0xFF)
    {
      /* no plug-in module installed */
      if (No_Module_Cnt < 4)
      {
        + +No_Module_Cnt;
      }
      else
      {
        LM_Installed = FALSE;
        GFM_Installed = FALSE;
        PORTA = PORTA | 0x10;  /*  activate alarm line  */
      }
    }
    else
    {
      No_Module_Cnt = 0;
    }
    .
    .
    .
    .
  }
}

/****************** START OF MONITOR FUNCTIONS ******************/ void Display_0 ()    /*  Type 0 Display Module  */
{
  /*  Toggle between 1 and 0  */
  Display_Counter = Display_Counter ^ 0x01;
  if ((Display_Counter > 0) && (Test_Running = = FALSE))
  {
    Calculate_Demand ();
    if ((Timing_Out = = TRUE) && (Overload_Event = = FALSE))
    {
      Overload_Event = TRUE;
    }
```

```
if ((Timing_Out = = FALSE) && (Overload_Event = = TRUE))
{
  /* Blank the display */
  LED_CTRL = 0;   /* No Data Coming, Code B, Decode, Shutdown */
  Overload_Event = FALSE;
} if (Display_Setting != MONITOR_SW & 0x0F)
{
  Display_Setting = MONITOR_SW & 0x0F;
  LED_CTRL = 0;   /* No Data Coming, Code B, Decode, Shutdown */
} switch (Display_Setting)
{
  case 0 :
    if (Overload_Event = = TRUE)
    {
      /* change Breaker Status to Overload */
      Str_Copy (Brkr_Status, OL);
      /* activate Load Monitor Alarm */
      PORTA = PORTA | 0x10;
      Display_Overload ();
    }
    else
    {
      /* load monitor alarm set at 100% of Rating Plug value */
      Monitor_Load (100);
    }
    break;
  case 1 :
    /* de-activate Load Monitor Alarm */
    PORTA = PORTA & 0xEF;
    if (Overload_Event = = TRUE)
    {
      /* change Breaker Status to Overload */
      Str_Copy (Brkr_Status, OL);
      Display_Overload ();
    }
    else
    {
      /* change Breaker Status to OK */
      Str_Copy (Brkr_Status, OK);
      /* display 15 minute demand */
      Display_Demand ();
    }
    break;
  case 2 :
    /* de-activate Load Monitor Alarm */
    PORTA = PORTA & 0xEF;
    if (Overload_Event = = TRUE)
    {
      /* change Breaker Status to Overload */
      Str_Copy (Brkr_Status, OL);
      Display_Overload ();
    }
    else
```

```
      {
        /* change Breaker Status to OK */
        Str_Copy (Brkr_Status, OK);
        /* display maximum demand */
        Display_Max_Demand ();
      }
      break;
   case 3 :
      /* de-activate Load Monitor Alarm */
      PORTA = PORTA & 0xEF;
      if (Overload_Event = = TRUE)
      {
        /* change Breaker Status to Overload */
        Str_Copy (Brkr_Status, OL);
        Display_Overload ();
      }
      else
      {
        /* change Breaker Status to OK */
        Str_Copy (Brkr_Status, OK);
        /* display phase A current */
        Display_Current (PH_A);
      }
      break;
   case 4 :
      /* de-activate Load Monitor Alarm */
      PORTA = PORTA & 0xEF;
      if (Overload_Event = = TRUE)
      {
        /* change Breaker Status to Overload */
        Str_Copy (Brkr_Status, OL);
        Display_Overload ();
      }
      else
      {
        /* change Breaker Status to OK */
        Str_Copy (Brkr_Status, OK);
        /* display phase B current */
        Display_Current (PH_B);
      }
      break;
   case 5 :
      /* de-activate Load Monitor Alarm */
      PORTA = PORTA & 0xEF;
      if (Overload_Event = = TRUE)
      {
        /* change Breaker Status to Overload */
        Str_Copy (Brkr_Status, OL);
        Display_Overload ();
      }
      else
      {
        /* change Breaker Status to OK */
        Str_Copy (Brkr_Status, OK);
        /* display phase C current */
        Display_Current (PH_C);
      }
```

```
    break;
case 6 :
  if (Overload_Event = = TRUE)
  {
    /* change Breaker Status to Overload */
    Str_Copy (Brkr_Status, OL);
    /* activate Load Monitor Alarm */
    PORTA = PORTA | 0x10;
    Display_Overload ();
  }
  else
  {
    /* load monitor alarm set at 60% of Rating Plug value */
    Monitor_Load (60);
  }
  break;
case 7 :
  if (Overload_Event = = TRUE)
  {
    /* change Breaker Status to Overload */
    Str_Copy (Brkr_Status, OL);
    /* activate Load Monitor Alarm */
    PORTA = PORTA | 0x10;
    Display_Overload ();
  }
  else
  {
    /* load monitor alarm set at 70% of Rating Plug value */
    Monitor_Load (70);
  }
  break;
case 8 :
  if (Overload_Event = = TRUE)
  {
    /* change Breaker Status to Overload */
    Str_Copy (Brkr_Status, OL);
    /* activate Load Monitor Alarm */
    PORTA = PORTA | 0x10;
    Display_Overload ();
  }
  else
  {
    /* load monitor alarm set at 80% of Rating Plug value */
    Monitor_Load (80);
  }
  break;
case 9 :
  if (Overload_Event = = TRUE)
  {
    /* change Breaker Status to Overload */
    Str_Copy (Brkr_Status, OL);
    /* activate Load Monitor Alarm */
    PORTA = PORTA | 0x10;
    Display_Overload ();
  }
  else
  {
```

```
            /* load monitor alarm set at 90% of Rating Plug value */
            Monitor_Load (90);
          }
          break;
      }
    }
  }
} void Display_1 ()   /* Type 1 Display Module */
{
  if (Display_Setting != (MONITOR_SW & 0x0F))
  {
    Display_Setting = MONITOR_SW & 0x0F;
    LED_CTRL = 0;   /* No Data Coming, Code B, Decode, Shutdown */
  }
  if (Display_Setting > 9)   /* valid switch values are 0 thru 9 */
  {
    Display_Setting = 1;   /* minimum setting (LO, .1 seconds) */
  }
  switch (Display_Setting)
  {
    case 0:
      GFM_Delay = GFM_500MS_DLY;
      GF_Monitor (GFM_MAX);
      break;
    case 1:
      GFM_Delay = GFM_100MS_DLY;
      GF_Monitor (GFM_LO);
      break;
    case 2:
      GFM_Delay = GFM_100MS_DLY;
      GF_Monitor (GFM_MED);
      break;
    case 3:
      GFM_Delay = GFM_100MS_DLY;
      GF_Monitor (GFM_HI);
       break;
    case 4:
      GFM_Delay = GFM_300MS_DLY;
      GF_Monitor (GFM_LO);
       break;
    case 5:
      GFM_Delay = GFM_300MS_DLY;
      GF_Monitor (GFM_MED);
       break;
    case 6:
      GFM_Delay = GFM_300MS_DLY;
      GF_Monitor (GFM_HI);
       break;
    case 7:
      GFM_Delay = GFM_500MS_DLY;
      GF_Monitor (GFM_LO);
       break;
    case 8:
      GFM_Delay = GFM_500MS_DLY;
      GF_Monitor (GFM_MED);
```

```
            break;
        case 9:
            GFM_Delay = GFM_500MS_DLY;
            GF_Monitor (GFM_HI);
            break;
    }
} void Display_2 ()    /* Type 2 Display Module */
{
    ; /* null C statment */
} void Display_3 ()    /* Type 3 Display Module */
{
    ; /* null C statment */
} void Display_4 ()    /* Type 4 Display Module */
{
    ; /* null C statment */
} void Display_5 ()    /* Type 5 Display Module */
{
    ; /* null C statment */
} void Display_6 ()    /* Type 6 Display Module */
{
    ; /* null C statment */
} void Display_7 ()    /* Type 7 Display Module */
{
    ; /* null C statment */
} unsigned int Sqr_Root (unsigned int Squared_Amps)
{
    void Int_by_Int_MUL (),
        Lg_Int_by_Int_DIV ();

unsigned int Dsply_Adjust;
    unsigned int Whole_Root;
    unsigned int Frac_Root;
    unsigned int Lo_Num;
    unsigned int Hi_Num;
    unsigned int Combo_Root;
    unsigned int Display_Amps;
```

```c
   if (Gain_Mode = = GAIN_ON)
   {
      Dsply_Adjust = Display_Adjust [GAIN_ON];
   }
   else
   {
      Dsply_Adjust = Display_Adjust [GAIN_OFF];
   }

Whole_Root = 0;
   while (Squares_Table [Whole_Root] < = Squared_Amps)
   {
      + +Whole_Root;
   }
   Hi_Num = Squares_Table [Whole_Root];
   --Whole_Root;
   Lo_Num = Squares_Table [Whole_Root];
   Frac_Root = ((Squared_Amps - Lo_Num) * 0x100) / (Hi_Num - Lo_Num);
   (Combo_Root = Whole_Root * 0x100) + Frac_Root;
   Display_Amps = (Combo_Root * Dsply_Adjust) / 0x100;  */
   return (Display_Amps);
} void Display_Overload ()
{
   static unsigned char Flash_Display = 0;

Flash_Display = Flash_Display ^ 0x01;  /* toggle between 1 and 0 */
   if (Flash_Display > 0)
   {
      if (Display_Data = = TRUE)
      {
         LED_CTRL = 0x90;  /* Data Coming, Code B, Decode, Normal mode */
         LED_DATA = 0x8A;  /* send a dash */
         LED_DATA = 0x8D;  /* send an "L" */
         LED_DATA = 0x80;  /* send an "O" */
         LED_DATA = 0x8A;  /* send a dash */
         LED_DATA = 0X8F;  /* unused digit, send a blank */
         LED_DATA = 0X8F;  /* unused digit, send a blank */
         LED_DATA = 0X8F;  /* unused digit, send a blank */
         LED_DATA = 0X8F;  /* unused digit, send a blank */
      }
      else
      {
         LED_CTRL = 0;  /* No Data Coming, Code B, Decode, Shutdown */
      }
   }
   else
   {
      LED_CTRL = 0;  /* No Data Coming, Code B, Decode, Shutdown */
   }
} void Monitor_Load (unsigned char Alarm_Setting)
```

```c
{
  static unsigned char Display_Blank = TRUE;
  static unsigned char Flash_Display = 0;
  unsigned int Setpoint;
  unsigned int Hi_Phase;
  unsigned char Display_Str [5];
  unsigned char Temp_Str [5];

if (Gain_Mode = = GAIN_ON)
  {
    /* Instantaneous 2x value / 2 = 100% pickup value */
    Setpoint = ((*(IN_Pickup_Ptr + 1) >> 1) * LT_GAIN_ON_CURRENT) / 10;
    Setpoint = (Setpoint * Percent_Rating) / 100;
    Setpoint = (Setpoint * Alarm_Setting) / 100;
    Setpoint = Setpoint * Display_Adjust [GAIN_ON];
  }
  else
  {
    /* Instantaneous 2x value / 2 = 100% pickup value */
    Setpoint = ((*(IN_Pickup_Ptr + 1) >> 1) * LT_GAIN_OFF_CURRENT) / 10;
    Setpoint = (Setpoint * Percent_Rating) / 100;
    Setpoint = (Setpoint * Alarm_Setting) / 100;
    Setpoint = Setpoint * Display_Adjust [GAIN_OFF];
  }
  Hi_Phase = Long_Time_RMS [PH_A];
  if (Long_Time_RMS [PH_B] > Hi_Phase)
  {
    Hi_Phase = Long_Time_RMS [PH_B];
  }
  if (Long_Time_RMS [PH_C] > Hi_Phase)
  {
    Hi_Phase = Long_Time_RMS [PH_C];
  }
  Hi_Phase = Sqr_Root (Hi_Phase);
  if (Hi_Phase > Setpoint)
  {
    /* change Breaker Status to Load Monitor Alarm */
    Str_Copy (Brkr_Status, A0);
    PORTA = PORTA | 0x10;    /* activate Load Monitor Alarm */
    Flash_Display = Flash_Display ^ 0x01; /* toggle between 1 and 0 */
    if (Flash_Display > 0)
    {
      Display_Blank = FALSE;
      Conv_to_Dec_Str (Hi_Phase, Display_Str);
      while (Str_Length (Display_Str) < 4)
      {
        Str_Copy (Temp_Str, Blank);
        Str_Concat (Temp_Str, Display_Str);
        Str_Copy (Display_Str, Temp_Str);
      }
      if (Display_Data = = TRUE)
      {
        LED_CTRL = 0x90;  /* Data Coming, Code B, Decode, Normal mode */
        LED_DATA = Display_Str [3] + 0x50;  /* send low order digit  */
        LED_DATA = Display_Str [2] + 0x50;  /* send 2rd order digit  */
        LED_DATA = Display_Str [1] + 0x50;  /* send 3nd order digit  */
        LED_DATA = Display_Str [0] + 0x50;  /* send high order digit */
```

```
            LED_DATA = OX8F;    /* unused digit, send a blank */
            LED_DATA = OX8F;    /* unused digit, send a blank */
            LED_DATA = OX8F;    /* unused digit, send a blank */
            LED_DATA = OX8F;    /* unused digit, send a blank */
          }
        else
        {
            LED_CTRL = 0;   /* No Data Coming, Code B, Decode, Shutdown */
        }
      }
      else
      {
        Display_Blank = TRUE;
        LED_CTRL = 0;   /* No Data Coming, Code B, Decode, Shutdown */
      }
    }
    else
    {
      Str_Copy (Brkr_Status, OK); /* change Breaker Status to OK */
      PORTA = PORTA & OxEF;       /* de-activate Load Monitor Alarm */
      if (Display_Blank = = FALSE)
      {
          LED_CTRL = 0;   /* No Data Coming, Code B, Decode, Shutdown */
          Display_Blank = TRUE;
      }
    }
} void Calculate_Demand ()
{
  unsigned int LT_Root_A;
  unsigned int LT_Root_B;
  unsigned int LT_Root_C;
  unsigned int LT_Avg_Root;
  static unsigned int Demand_Counter = 0;
  static unsigned long int LT_Avg_Sum = 0;

LT_Root_A = Sqr_Root (Long_Time_RMS [PH_A]);
  LT_Root_B = Sqr_Root (Long_Time_RMS [PH_B]);
  LT_Root_C = Sqr_Root (Long_Time_RMS [PH_C]);
  LT_Avg_Root = (LT_Root_A + LT_Root_B + LT_Root_C) / 3;
  LT_Avg_Sum = LT_Avg_Sum + LT_Avg_Root;
  + +Demand_Counter;
  if (Demand_Counter > = 1155)   /* 1155 = 15 minutes */
  {
    LT_Demand = LT_Avg_Sum / Demand_Counter);
    if (LT_Demand > Max_LT_Demand)
    {
      Max_LT_Demand = LT_Demand;
    }
    Demand_Counter = 0;
    LT_Avg_Sum = 0;
  }
}
```

```c
void Display_Demand ()
{
  unsigned char Display_Str [5];
  unsigned char Temp_Str [5];

if (LT_Demand > 0)
  {
    Conv_to_Dec_Str (LT_Demand, Display_Str);
    while (Str_Length (Display_Str) < 4)
    {
      Str_Copy (Temp_Str, Blank);
      Str_Concat (Temp_Str, Display_Str);
      Str_Copy (Display_Str, Temp_Str);
    }
    if (Display_Data = = TRUE)
    {
      LED_CTRL = 0x90;   /* Data Coming, Code B, Decode, Normal mode */
      LED_DATA = Display_Str [3] + 0x50;  /* send low order digit   */
      LED_DATA = Display_Str [2] + 0x50;  /* send 2rd order digit   */
      LED_DATA = Display_Str [1] + 0x50;  /* send 3nd order digit   */
      LED_DATA = Display_Str [0] + 0x50;  /* send high order digit  */
      LED_DATA = 0X8F;   /* unused digit, send a blank */
      LED_DATA = 0X8F;   /* unused digit, send a blank */
      LED_DATA = 0X8F;   /* unused digit, send a blank */
      LED_DATA = 0X8F;   /* unused digit, send a blank */
    }
    else
    {
      LED_CTRL = 0;   /* No Data Coming, Code B, Decode, Shutdown */
    }
  }
} void Display_Max_Demand ()
{
  unsigned char Display_Str [5];
  unsigned char Temp_Str [5];

if (Max_LT_Demand > 0)
  {
    Conv_to_Dec_Str (Max_LT_Demand, Display_Str);
    while (Str_Length (Display_Str) < 4)
    {
      Str_Copy (Temp_Str, Blank);
      Str_Concat (Temp_Str, Display_Str);
      Str_Copy (Display_Str, Temp_Str);
    }
    if (Display_Data = = TRUE)
    {
      LED_CTRL = 0x90;   /* Data Coming, Code B, Decode, Normal mode */
      LED_DATA = Display_Str [3] + 0x50;  /* send low order digit   */
      LED_DATA = Display_Str [2] + 0x50;  /* send 2rd order digit   */
      LED_DATA = Display_Str [1] + 0x50;  /* send 3nd order digit   */
      LED_DATA = Display_Str [0] + 0x50;  /* send high order digit  */
      LED_DATA = 0X8F;   /* unused digit, send a blank */
      LED_DATA = 0X8F;   /* unused digit, send a blank */
```

```c
      LED_DATA = OX8F;   /* unused digit, send a blank  */
      LED_DATA = OX8F;   /* unused digit, send a blank  */
    }
    else
    {
      LED_CTRL = 0;   /* No Data Coming, Code B, Decode, Shutdown  */
    }
  }
} void Reset_Max_Demand ()
{
  LED_CTRL = 0;   /* No Data Coming, Code B, Decode, Shutdown  */
  Max_LT_Demand = 0;
} void Display_Current (unsigned char Phase)
{
  unsigned int  LT_Root;
  unsigned char Display_Str [5];
  unsigned char Temp_Str [5];

switch (Phase)
  {
    case PH_A :
      LT_Root = Long_Time_RMS [PH_A];
      break;
    case PH_B :
      LT_Root = Long_Time_RMS [PH_B];
      break;
    case PH_C :
      LT_Root = Long_Time_RMS [PH_C];
      break;
  }
  LT_Root = Sqr_Root (LT_Root);
  Conv_to_Dec_Str (LT_Root, Display_Str);
  while (Str_Length (Display_Str) < 4)
  {
    Str_Copy (Temp_Str, Blank);
    Str_Concat (Temp_Str, Display_Str);
    Str_Copy (Display_Str, Temp_Str);
  }
  if (Display_Data == TRUE)
  {
    LED_CTRL = 0x90;   /* Data Coming, Code B, Decode, Normal mode  */
    LED_DATA = Display_Str [3] + 0x50;   /* send low order digit   */
    LED_DATA = Display_Str [2] + 0x50;   /* send 2rd order digit   */
    LED_DATA = Display_Str [1] + 0x50;   /* send 3nd order digit   */
    LED_DATA = Display_Str [0] + 0x50;   /* send high order digit  */
    LED_DATA = OX8F;   /* unused digit, send a blank  */
    LED_DATA = OX8F;   /* unused digit, send a blank  */
    LED_DATA = OX8F;   /* unused digit, send a blank  */
    LED_DATA = OX8F;   /* unused digit, send a blank  */
  }
  else
```

```c
  {
    LED_CTRL = 0;   /* No Data Coming, Code B, Decode, Shutdown */
  }
} void Display_GF_Amps (unsigned char Display_Mode)
{
  static unsigned char  Flash_Display = 0;
  unsigned int GFM_rms;
  unsigned char Display_Str [5];
  unsigned char Temp_Str [5];

if (Display_Mode = = GFM_FLASH_ON)
  {
    Flash_Display = Flash_Display ^ 0x01;   /* toggle between 1 and 0 */
  }
  else
  {
    Flash_Display = 1;
  }
  if (Flash_Display > 0)
  {
    GFM_rms = Sqr_Root (GFM_Average);
    Conv_to_Dec_Str (GFM_rms, Display_Str);
    while (Str_Length (Display_Str) < 4)
    {
      Str_Copy (Temp_Str, Blank);
      Str_Concat (Temp_Str, Display_Str);
      Str_Copy (Display_Str, Temp_Str);
    }
    LED_CTRL = 0x90; /* Data Coming, Code B, Decode, Normal mode */
    LED_DATA = Display_Str [3] + 0x50;  /* send low order digit  */
    LED_DATA = Display_Str [2] + 0x50;  /* send 2rd order digit  */
    LED_DATA = Display_Str [1] + 0x50;  /* send 3nd order digit  */
    LED_DATA = Display_Str [0] + 0x50;  /* send high order digit */
    LED_DATA = 0X8F;            /* unused digit, send a blank */
    LED_DATA = 0X8F;            /* unused digit, send a blank */
    LED_DATA = 0X8F;            /* unused digit, send a blank */
    LED_DATA = 0X8F;            /* unused digit, send a blank */
  }
  else
  {
    LED_CTRL = 0;   /* No Data Coming, Code B, Decode, Shutdown */
  }
} void GF_Monitor (unsigned char GFM_PU_Level)
{
  unsigned int Lo_Tbl_Val;
  unsigned int Hi_Tbl_Val;
  unsigned int Max_Val;
  unsigned int GF_Tbl_Val;
  unsigned int Percent_88;

void Int_by_Char_MUL (),
```

```
        Lg_Int_by_Char_DIV (),
        Lg_Int_by_Lg_Int_MUL ();

Lo_Tbl_Val = (int) *GF_Pickup_Ptr;
Hi_Tbl_Val = (int) *(GF_Pickup_Ptr + 9);
if (Brkr_Type [1] < '2')
{
   switch (Brkr_Type [1])
   {
      case '0':  /*  400 amp breaker  */
         if (Gain_Mode = = GAIN_ON)
         {
            Max_Val = 255;
         }
         else
         {
            Max_Val = 300;
         }
         break;
      case '1':  /*  800 amp breaker  */
         Max_Val = 150;
         break;
   }
}
else
{
   Max_Val = Hi_Tbl_Val;
}
switch (GFM_PU_Level)
{
   case GFM_LO:
      GF_Tbl_Val = Lo_Tbl_Val;
      break;
   case GFM_MED:
      GF_Tbl_Val = (Lo_Tbl_Val + Hi_Tbl_Val) / 2;
      break;
   case GFM_HI:
      GF_Tbl_Val = Hi_Tbl_Val;
      break;
   case GFM_MAX:
      GF_Tbl_Val = Max_Val;
      break;
}
GF_M_Pickup [GAIN_ON] = (GF_Tbl_Val * GF_GAIN_ON_CURRENT) / 100;
GF_M_Pickup [GAIN_OFF] = (GF_Tbl_Val * GF_GAIN_OFF_CURRENT) / 100;
if (Gain_Mode = = GAIN_ON)
{
   GFM_Pickup = GF_M_Pickup [GAIN_ON];
}
else
{
   GFM_Pickup = GF_M_Pickup [GAIN_OFF];
}
if (GFM_Pickup = = 0)
{
   GFM_Pickup = 1;  /*  GFM pickup must be greater than 0  */
}
```

```
if (Display_Data = = TRUE)
{
  GFM_Sample [GFM_Sample_Cnt] = GF_Mean;
  GFM_Sum = GFM_Sum + GFM_Sample [GFM_Sample_Cnt];
  GFM_Sample_Cnt = + +GFM_Sample_Cnt & 0x0F;
  GFM_Sum = GFM_Sum - GFM_Sample [GFM_Sample_Cnt];
  if (GFM_Sum < 0)
  {
    GFM_Sum = 0;
  }
  GFM_Average = GFM_Sum /16;
  if (GFM_Average < GFM_Pickup)
  {
    Percent_88 = GFM_Pickup - (GFM_Pickup > > 2);
    if (GFM_Average < Percent_88)
    {
      Display_GF_Amps (GFM_FLASH_OFF);
    }
    else
    {
      Display_GF_Amps (GFM_FLASH_ON);
    }
  }
  else /* GFM_Average > = GFM_Pickup */
  {
    Display_Overload ();
  }
}
else
{
  LED_CTRL = 0;   /* No Data Coming, Code B, Decode, Shutdown */
}
}
/******************* END OF MONITOR FUNCTIONS *********************/
```

What is claimed is:

1. A trip unit comprising:

a first connector;

a processor which selectively accesses program code for transferring data between the processor and a plurality of separate types of optional feature modules;

a data bus coupled between the first connector and the processor; wherein said plurality of separate types of optional feature modules are comprised of at least one ground fault monitor module including therein a memory which stores ground fault monitor module configuration data, and a second connector coupled to the memory and connected to the first connector, wherein the processor reads the configuration data, so as to identify that the ground fault monitor module is coupled to the connectors, accesses a respective portion of the program code based upon the configuration data read from the ground fault monitor module, and transfers data between the processor and the ground fault monitor module.

2. The unit of claim 1, where the memory is a set of jumpers.

3. The unit of claim 1, where the ground fault monitor module comprises a digital display which displays alphanumeric data in response to data transferred from the processor to the ground fault monitor module.

4. The unit of claim 3, where the ground fault monitor module comprises a switch coupled to the second connector to provide control data to the processor, the processor providing display data to the digital display which is dependent upon the control data.

5. The unit of claim 1, wherein the ground fault monitor module comprises a switch coupled to the second connector to provide control data to the processor, and where the processor sets limit values in the trip unit based upon the control data.

6. The unit of claim 5 wherein the control data comprises pick-up and delay settings and wherein the trip unit comprises means for generating a first alarm signal when detected ground fault parameters exceed the pick-up and delay settings.

7. The unit of claim 6 wherein the trip unit comprises an internal ground fault protection mechanism having an internal set of pickup and delay settings and wherein the means for generating the first alarm signal operates independent of the internal set of pickup and delay settings.

8. The unit of claim 6 further comprising means for generating a second alarm signal responsive to ground fault parameters exceeding the internal pickup and delay settings, wherein the second alarm signal is operable independently of the first alarm signal.

9. The unit of claim 8 wherein the second alarm signal is connected to operate a shunt trip mechanism.

10. A plug-in ground fault monitor module for a trip unit having a processor which selectively accesses program code for transferring data between the processor and a plurality of separate types of optional feature modules, the plug-in ground fault monitor module comprising:

means for mechanically seating the plug-in ground fault monitor module in the trip unit;

a memory device for storing plug-in ground fault monitor module configuration data;

a digital display which displays alphanumeric data in response to data transferred from the processor to the plug-in ground fault monitor module;

a connector coupled to the memory device for providing a data transfer path between the trip unit and the plug-in ground fault monitor module, wherein the data transfer path provides the trip unit with access to the configuration data and the digital display and wherein the processor reads the configuration data, so as to identify that the plug-in ground fault monitor module is coupled to the connector, accesses a respective portion of the program code based upon the configuration data read from the plug-in ground fault monitor module and transfers data between the processor and the plug-in ground fault monitor module.

11. The plug-in ground fault monitor module of claim 10, wherein the memory is a set of jumpers.

12. The plug-in ground fault monitor module of claim 10, wherein the ground fault monitor module comprises a switch coupled to the connector to provide control data to the trip unit.

13. The plug-in ground fault monitor module of claim 10, wherein the ground fault monitor module further comprises:

a switch coupled to the connector to provide control data to the processor; and, a visual indicator which indicates levels at which the trip unit will set limit values based upon the control data generated by a position of the switch.

14. A plug-in ground fault monitor module for a trip unit having a processor which selectively accesses program code for transferring data between the processor and a plurality of separate types of optional feature modules, the ground fault monitor comprising:

means for mechanically seating the plug-in ground fault monitor module in the trip unit;

at least one jumper memory device for storing configuration data;

a digital display which displays alphanumeric data in response to data transferred from the processor to the plug-in ground fault monitor module;

a connector coupled to the memory device for providing a data transfer path between the trip unit and the plug-in ground fault monitor module, wherein the data transfer path provides the trip unit with access to the configuration data and the digital display and wherein the processor reads the configuration data, so as to identify that the plug-in ground fault module is coupled to the connector, accesses a respective position of the program code based upon the configuration data read from the plug-in ground fault monitor module and transfers data between the processor and the plug-in ground fault monitor module;

a user operable switch coupled to the connector to provide control data to the processor; and, a visual indicator which indicates levels at which the trip unit will set limit values based upon the control data generated by a position of the user operable switch.

15. A circuit breaker trip unit comprising:

a processor which selectively accesses program code for operating a plurality of types of optional feature remote actuation modules; and an optional feature remote actuation module for actuating remote circuit protection devices, which is insertable into the trip unit and coupled to the processor, the optional feature remote actuation module including therein a memory which stores optional feature remote actuation configuration data;

wherein the processor accesses the module memory, reads the configuration data, and accesses a respective portion of the program code for operation of the optional feature remote actuation module, based on the configuration data.

16. A circuit breaker trip unit comprising:

a connector for receipt of different types of interchangeable optional feature remote actuation modules;

a processor, coupled to the connector, for reading identification configuration data from an optional feature remote actuation module, for actuating remote circuit protection devices, that is also coupled to the connector; and memory coupled to the processor having program codes stored therein for operating a plurality of types of optional feature remote actuation modules;

wherein the processor reads the identification configuration data, and accesses a respective portion of said program codes for operation of the optional feature remote actuation module that is coupled to the connector, based on the configuration data read therefrom.

* * * * *